United States Patent
Pai

(10) Patent No.: US 7,272,879 B2
(45) Date of Patent: *Sep. 25, 2007

(54) GLASS MOLDING DIE, RENEWAL METHOD THEREOF, AND GLASS FABRICATED BY THE MOLDING DIE

(75) Inventor: Jui-Fen Pai, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 417 days.

This patent is subject to a terminal disclaimer.

(21) Appl. No.: 10/883,456

(22) Filed: Jul. 1, 2004

(65) Prior Publication Data

US 2005/0223742 A1 Oct. 13, 2005

(30) Foreign Application Priority Data

Apr. 9, 2004 (TW) ................ 93110035 A

(51) Int. Cl.
*B23P 6/00* (2006.01)
*C03B 11/08* (2006.01)
*C03B 9/48* (2006.01)
*C03B 40/02* (2006.01)
*C03B 3/02* (2006.01)
*B28B 7/36* (2006.01)

(52) U.S. Cl. .................. 29/402.01; 65/374.11; 65/374.12; 65/26; 65/27; 249/114.1

(58) Field of Classification Search ............. 65/26, 65/374.12, 374.11, 171, 17.1, 27; 264/219; 427/140, 142, 534, 154, 156, 404, 405; 29/402.01; 249/114.1

See application file for complete search history.

(56) References Cited

U.S. PATENT DOCUMENTS

| | | | | |
|---|---|---|---|---|
| 4,876,042 A | * | 10/1989 | Imataki et al. | 264/39 |
| 5,700,307 A | * | 12/1997 | Kashiwagi et al. | 65/374.1 |
| 6,066,291 A | * | 5/2000 | Chen et al. | 420/445 |
| 6,258,402 B1 | * | 7/2001 | Hussary et al. | 427/142 |
| 7,220,448 B2 | * | 5/2007 | Pai | 427/142 |
| 2002/0002844 A1 | * | 1/2002 | Masuda et al. | 65/374.11 |
| 2005/0139989 A1 | * | 6/2005 | Pai | 257/702 |

FOREIGN PATENT DOCUMENTS

| | | | |
|---|---|---|---|
| JP | 63103836 | * | 5/1988 |
| JP | 11079760 | * | 3/1999 |
| JP | 2003-277074 | * | 2/2003 |
| JP | 2003-277074 | | 10/2003 |

* cited by examiner

*Primary Examiner*—Steven P. Griffin
*Assistant Examiner*—DeMaris R. Wilson
(74) *Attorney, Agent, or Firm*—Thomas, Kayden, Horstemeyer & Risley

(57) ABSTRACT

A molding die for molding glass and renewal method thereof. The molding die includes a substrate, a nickel-phosphorous alloy layer, with phosphorous content 30 wt % or less, overlying the substrate, an intermediate layer overlying the nickel-phosphorous alloy layer, and a passivation film overlying the intermediate layer.

25 Claims, 12 Drawing Sheets

GLASS MOLDING DIE, RENEWAL METHOD THEREOF, AND GLASS FABRICATED BY THE MOLDING DIE

BACKGROUND OF THE INVENTION

1. Field of the Invention

The present invention relates to a molding die, and more specifically to a glass molding die and renewal method thereof.

2. Description of the Related Art

A molding die disclosed in JP2003-277074 by Yokoyama et al. sequentially provides a chromium layer and platinum-iridium alloy layer, or a chromium layer, a chromium nitride layer, and platinum-iridium alloy layer overlying a tungsten carbide substrate. The chromium layer is hard chromium, having high hardness and wear resistance. The ground molding die can maintain good surface accuracy (low peak to valley value) and low roughness resulting from the wear of the platinum-iridium alloy layer during predetermined time being as five times as that of the chromium layer, accelerating renewal thereof. When the surface profile of the chromium layer deviates, however, the chromium layer quickly can damage a diamond tool because chromium is a transition element, having unshared electrons in d orbital with resulting chemical wear to the diamond tool. When correcting the surface profile of the chromium layer using grinding, the renewing process is difficult and time-consuming resulting from the high wear resistance of the chromium layer.

SUMMARY OF THE INVENTION

Thus, objects of the present invention are to provide a glass molding die and renewal method thereof with better renewability and shortened renewing time, irrespective of the surface profile (surface accuracy) thereof.

One aspect of the present invention is provision of a nickel-phosphorous alloy layer acting as a stop layer overlying a molding die substrate with about 10 to 30 wt % of phosphorous content. The phosphorous atoms are capable of capture of unshared electrons in d orbital of nickel and lubrication to a diamond tool when correcting the surface profile thereof. Thus, the surface profile of the nickel-phosphorous alloy layer can be corrected by the diamond tool, improving the renewability of the molding die and reducing the renewing cost.

A further aspect of the present invention is provision of a nickel-phosphorous alloy layer acting as a stop layer overlying a molding die substrate. When the nickel-phosphorous alloy layer has about 1 to 10 wt % of phosphorous content, the surface profile of the nickel-phosphorous alloy layer can be corrected by abrasive machining or grinding, accelerating renewal of the molding die, with improved renewability and renewal time of the molding die.

A further aspect of the present invention is provision of a nickel-phosphorous alloy layer acting as a stop layer overlying a molding die substrate. The nickel-phosphorous alloy layer can be removed by nitric acid without damage to the substrate. A new nickel-phosphorous alloy layer can be formed on the substrate. Thus, renewability and renewal time of the molding die can be improved.

A further aspect of the present invention is varied wear resistance between intermediate layer/passivation film and the stop layer of the molding die. Thus, diamond turning or grinding completion can be easily detected when the passivation film and intermediate layer are completely removed during the renewing process.

In order to achieve the described objects, the present invention provides a glass molding die, having a substrate, a nickel-phosphorous alloy layer, an intermediate layer overlying the nickel-phosphorous alloy layer, and a passivation film overlying the intermediate layer. The phosphorous content of the nickel-phosphorous alloy layer is 30 wt % or less.

The present invention further provides a renewal method for a glass molding die. First, a used glass molding die is provided, comprising a substrate, a nickel-phosphorous alloy layer, with phosphorous content 30 wt % or less, overlying the substrate, a first intermediate layer overlying the nickel-phosphorous alloy layer, and a first passivation film overlying the first intermediate layer. Then, the first passivation film and first intermediate layer are removed using the nickel-phosphorous alloy layer as a stop layer, exposing the nickel-phosphorous alloy layer. Next, the exposed nickel-phosphorous alloy layer is cleaned. Further, a second intermediate layer is formed overlying the nickel-phosphorous alloy layer. Finally, a second first passivation film is formed overlying the second intermediate layer.

The present invention further provides a renewal method for a glass molding die. First, a used glass molding die is provided, comprising a substrate, a first nickel-phosphorous alloy layer, with phosphorous content 30 wt % or less, overlying the substrate, a first intermediate layer overlying the nickel-phosphorous alloy layer, and a first passivation film overlying the first intermediate layer. Then, the first passivation film and first intermediate layer are removed using the nickel-phosphorous alloy layer as a stop layer. Next, the first nickel-phosphorous alloy layer is removed using the substrate as a stop layer, exposing the substrate. Next, the exposed substrate is cleaned. Next, a second nickel-phosphorous alloy layer, with phosphorous content as large as 30 wt % or less, is formed overlying the substrate. Further, a second intermediate layer is formed overlying the nickel-phosphorous alloy layer. Finally, a second first passivation film is formed overlying the second intermediate layer.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The following embodiments are intended to illustrate the invention more fully without limiting the scope of the claims, since numerous modifications and variations will be apparent to those skilled in this art.

Figure 1:
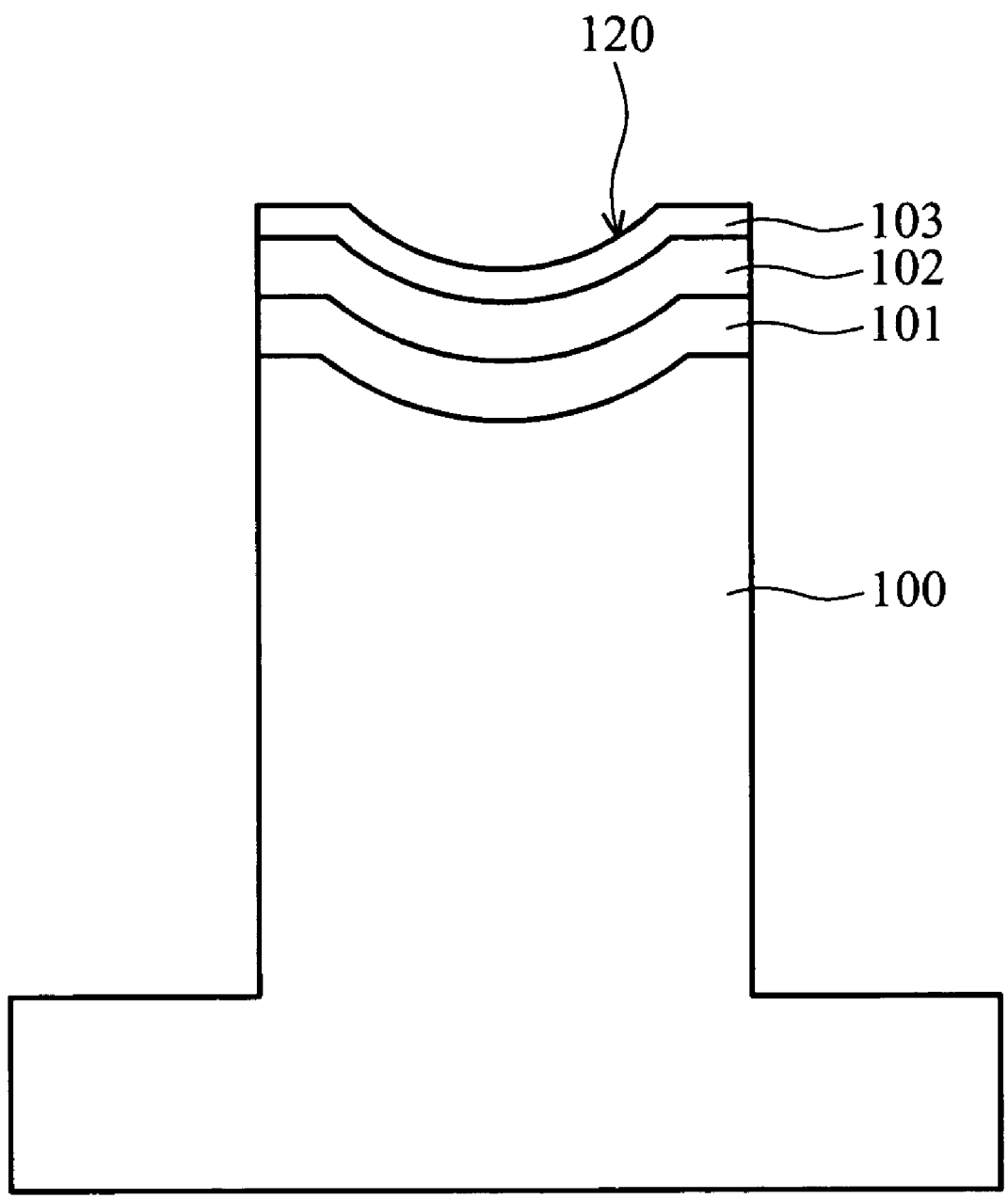
FIG. 1 is a cross-section of the molding die of the present invention.

FIG. 1 is a cross-section of the molding die of the present invention. The structure comprises a substrate 100, nickel-phosphorous alloy layer 101, intermediate layer 102, and passivation layer 103. The passivation layer 103 further comprises a molding surface 120.

The substrate 100 is tungsten carbide. During the formation of the nickel-phosphorous alloy layer 101, a surface of substrate 100 is ground and polished, followed by formation of the nickel-phosphorous alloy layer 101 overlying the polished surface of substrate 100 by, for example, sputtering or electroless plating. The phosphorous content of the nickel-phosphorous alloy layer 101 is 30 wt % or less. The nickel-phosphorous alloy layer 101 is preferably about 20 to 100 µm thick, and more preferably further comprises about 0.1 to 10 wt % of high melting point metal such as tungsten, tantalum, manganese, or combinations thereof to further improve the hardness, wear resistance, and thermal resistance thereof, thereby improving lifetime of the nickel-phosphorous alloy layer 101 and further the molding die of the present invention. Further, when the phosphorous content of the nickel-phosphorous alloy layer 101 is between about 1 and 10 wt %, surface profile of the nickel-phosphorous alloy layer 101 can be corrected by abrasive machining or grinding. When the phosphorous content of the nickel-phosphorous alloy layer 101 is between about 10 and 30 wt %, surface profile of the nickel-phosphorous alloy layer 101 can be corrected by diamond turning.

The intermediate layer 102 overlying the nickel-phosphorous alloy layer 101 preferably comprises nickel to improve adhesion between the nickel-phosphorous alloy layer 101 and intermediate layer 102. The passivation film 103 overlying the intermediate layer 102 is preferably chemically passive to prevent chemical reaction between glass and the molding die during process to improve product yield and lifetime of the molding die. Further, the passivation film 103 more preferably comprises noble metals such as combinations of at least two of iridium, rhenium, platinum, ruthenium, rhodium, and osmium, providing denser crystal structure to prevent the elements in substrate 100 from diffusion into the molding die surface, further improving product yield and lifetime of the molding die. Therefore, the intermediate layer 102 is more preferably an alloy of nickel and combinations of at least two of iridium, rhenium, platinum, ruthenium, rhodium, and osmium to improve adhesion between the intermediate layer 102 and passivation film 103. Thus, adhesions between the substrate 100, nickel-phosphorous alloy layer 101, intermediate layer 102, and passivation film 103 are sufficient to improve lifetime and reduce the renewal frequency of the molding die of the present invention, reducing the process cost.

When the intermediate layer 102 is an alloy of nickel and combinations of at least two of iridium, rhenium, platinum, ruthenium, rhodium, and osmium, the intermediate layer 102 can be formed by a method such as co-sputtering. The substrate 100 with polished nickel-phosphorous alloy layer 101 thereon is disposed in a chamber (not shown), and iridium, rhenium, platinum, ruthenium, rhodium, osmium and, nickel or nickel alloy targets are provided and bias power applied to each desired target respectively according to the predetermined composition of the intermediate layer 102. Sputtering time is determined according to the predetermined thickness of the intermediate layer 102 overlying nickel-phosphorous alloy layer 101. The intermediate layer 102 is preferably 0.1 to 1 µm thick.

When the passivation film 103 comprises combinations of at least two of iridium, rhenium, platinum, ruthenium, rhodium, and osmium, the passivation film 103 can be formed by a method such as co-sputtering. The passivation film 103 is preferably formed immediately after the formation of the intermediate layer 102. When the formation of intermediate layer 102 is completed, the bias power to the iridium, rhenium, platinum, ruthenium, rhodium, osmium targets is the same as the formation of the intermediate layer 102 and the bias power to the nickel or nickel alloy target is cut to form the passivation film 103. The thickness of passivation film 103 is preferably about 0.02 to 0.3 µm. Thus, the molding die of the present invention is completed.

FIGS. 2A through 2F are cross-sections of one embodiment of the renewal method of the molding die of the present invention.

The molding die shown in FIG. 1 is off-line and renewed from production when approaching or reaching the end of its lifetime, or the surface roughness (especially the Rms vale) is out of specification.

Figure 2A:
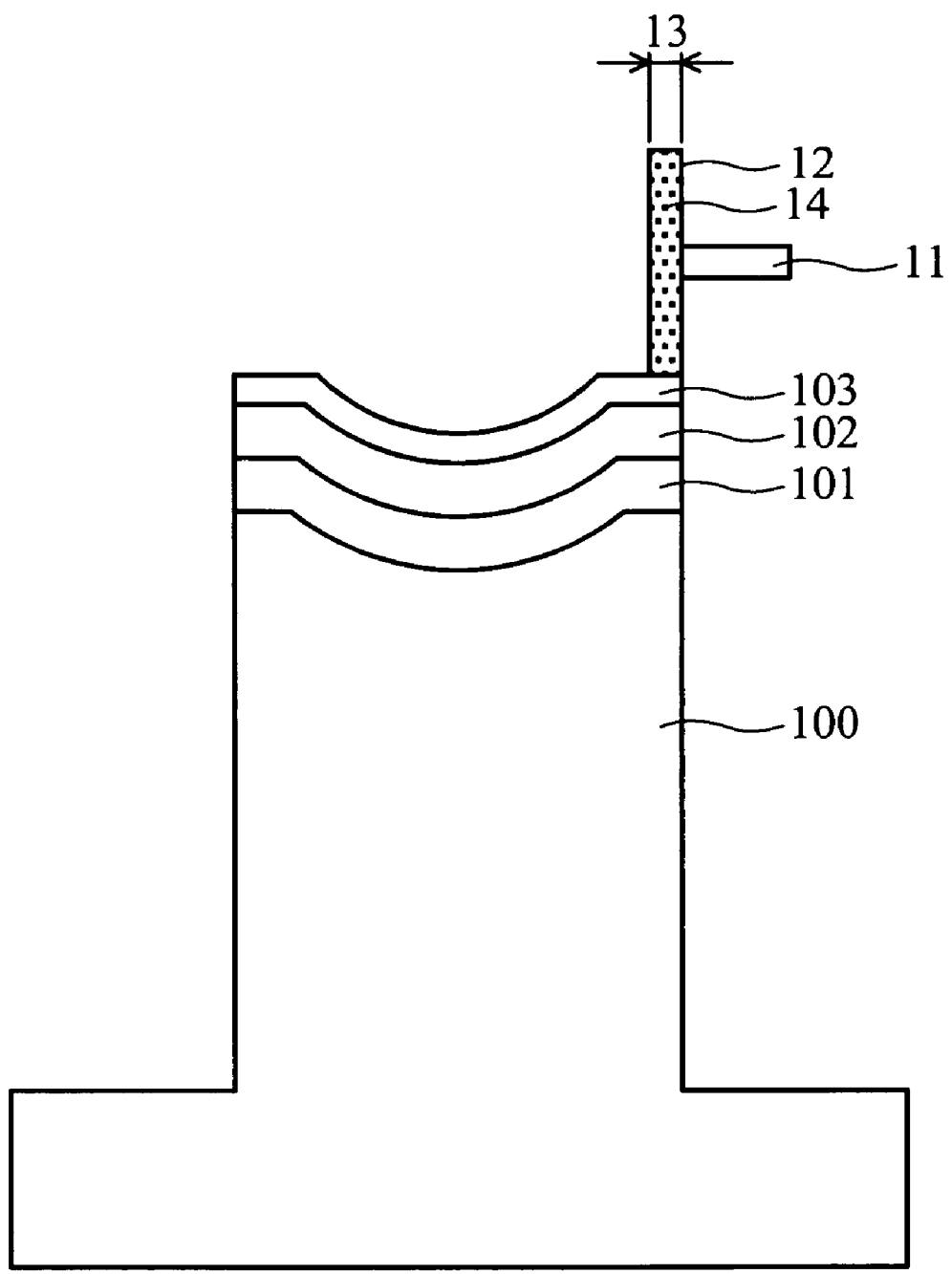
FIGS. 2A through 2F are cross-sections of one embodiment of the renewal method of the molding die of the present invention.

First, in FIG. 2A, the passivation film 103 and intermediate layer 102 are removed, exposing the nickel-phosphorous alloy layer 101. The removal can be achieved by use of a first grinding wheel assembly, comprising an approximately disk-shaped grinding wheel 12 and a driving spindle 11 at the center of the grinding wheel 12. The grinding wheel 12 has a circumferential surface 13 acting as a grinding surface. The first grinding wheel assembly is preferably a diamond grinding wheel assembly with inlaid diamond particles 14 on the circumferential surface 13. The quantity and diameter of the diamond particles 14 depend on the desired grinding rate and ground roughness of a ground object.

In FIG. 2A, the passivation film 103 and intermediate layer 102 are ground by the circumferential surface 13 resulting from rotation of the grinding wheel 12 driven by the spindle 11 during removal of the passivation film 103 and intermediate layer 102. The nickel-phosphorous alloy layer 101 has high wear resistance and the wear rate thereof is much less than those of the intermediate layer 102 and passivation film 103. Therefore, when the grinding wheel 12 contacts the nickel-phosphorous alloy layer 101, a sharp reduction in wear rate is easily detected, resulting in the nickel-phosphorous alloy layer 101 acting as a stop layer to detect completion of removal of the passivation film 103 and intermediate layer 102.

Figure 2B:
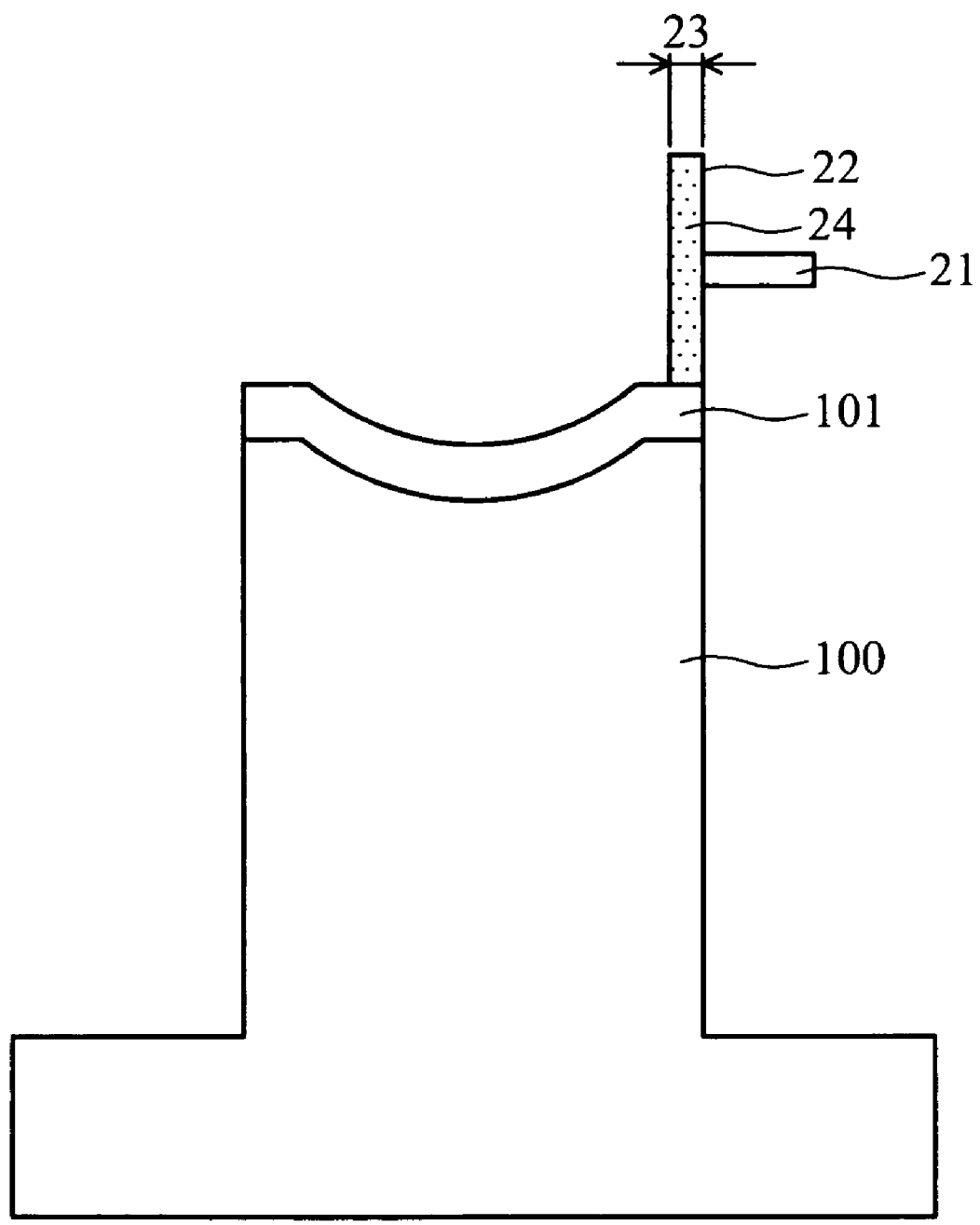

In FIG. 2B, an optional step for polishing the nickel-phosphorous alloy layer 101 is provided as desired, in order to ensure the roughness of an exposed surface of the nickel-phosphorous alloy layer 101 matching process requirements. When the phosphorous content of the nickel-phosphorous alloy layer 101 is between about 1 and 10 wt %, the exposed surface of the nickel-phosphorous alloy layer 101 can be precisely machined by grinding, using an apparatus such as a second grinding wheel assembly as shown in FIG. 2B. The second grinding wheel assembly comprises an approximately disk-shaped grinding wheel 22 and a driving spindle 21 at the center of the grinding wheel 22. The grinding wheel 22 has a circumferential surface 23 acting as a grinding surface. The second grinding wheel assembly is preferably a diamond grinding wheel assembly with inlaying diamond particles 24 on the circumferential surface 23. The diameters of the diamond particles 24 are preferably less than those of the diamond particles 14 of the first grinding wheel assembly shown in FIG. 2A.

Note that the apparatus and method of polishing the nickel-phosphorous alloy layer 101 shown in FIG. 2B are an example, and not intended to limit the scope of the present invention. Those skilled in the art will recognize the possibility of using various apparatuses and methods to achieve the polish shown in FIG. 2B. When the phosphorous content of the nickel-phosphorous alloy layer 101 is between about 1 and 10 wt %, the use of the second grinding wheel assembly is preferred.

Figure 2C:
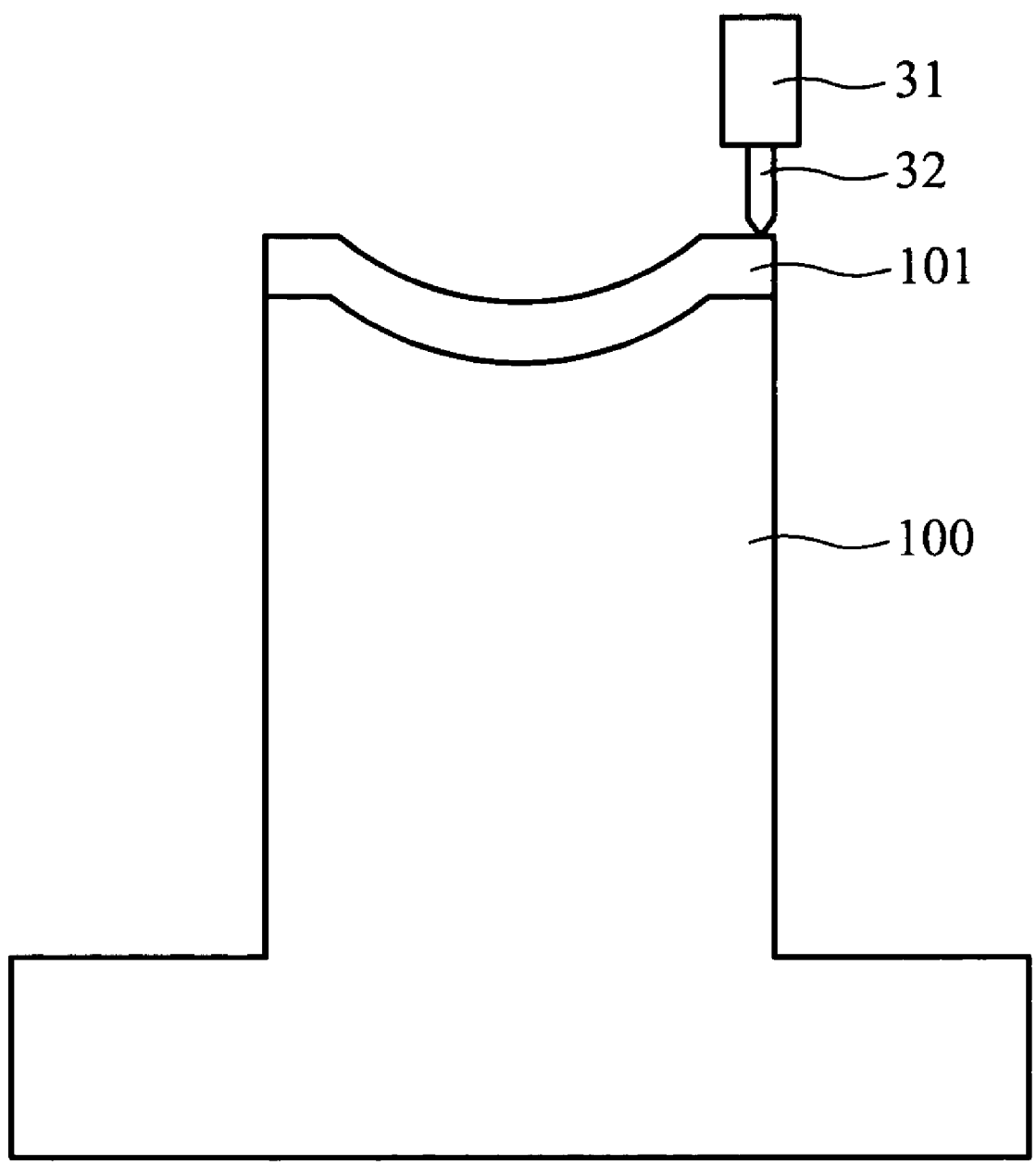

In FIG. 2C, when the phosphorous content of the nickel-phosphorous alloy layer 101 is between about 4 and 30 wt %, preferably between about 10 and 30 wt %, a single point diamond tool is preferred to polish the nickel-phosphorous alloy layer 101 because electrons of phosphorous atoms may share with the unshared electrons of nickel atoms to prevent the reaction between the unshared electrons of nickel atoms and carbon-carbon bonds of diamond, and phosphorous may form a protection film on a surface of diamond, preventing chemical wear of the diamond tool and protect the diamond tool, thereby reducing the renewal cost of the molding die. The diamond tool comprises a diamond blade 32 to cut the nickel-phosphorous alloy layer 101 and a coupling agent 31 to fix and drive the diamond blade 32. The exposed nickel-phosphorous alloy layer 101 is cut along the former surface profile (surface accuracy) thereof by the diamond blade 32 to achieve a desired roughness.

Figure 3A:
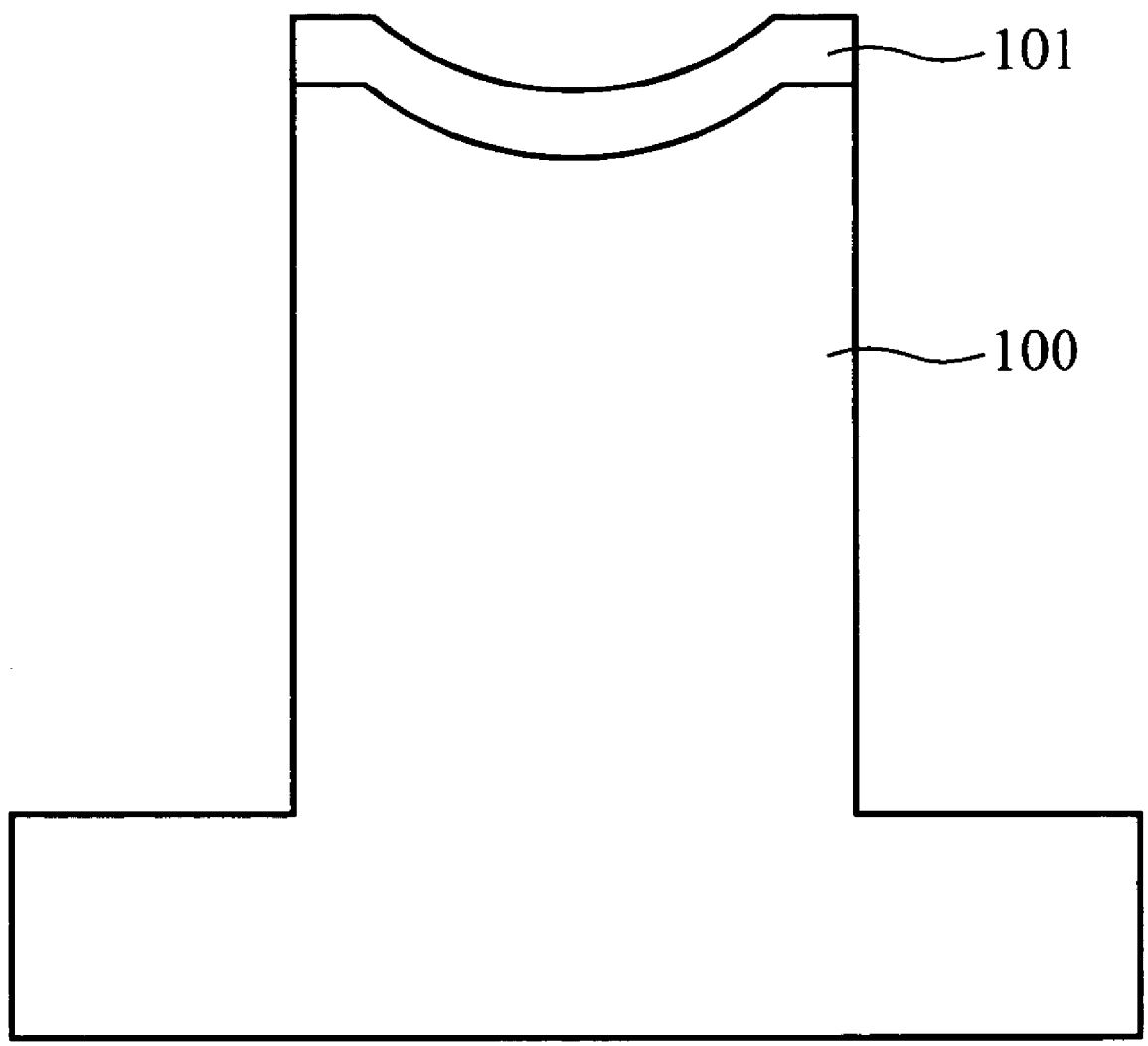
FIGS. 3A through 3E are cross-sections of another embodiment of the renewal method of the molding die of the present invention.
Figure 3B:
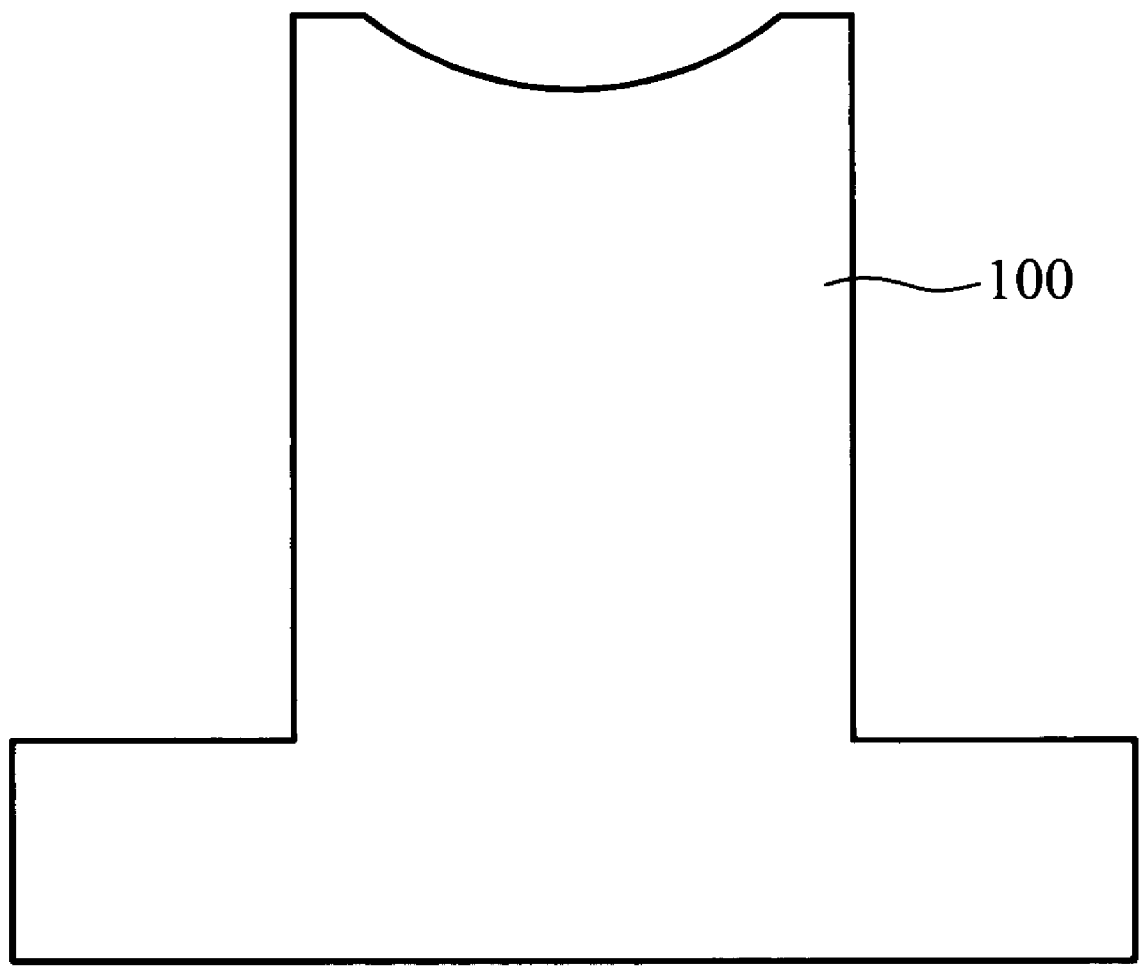
Figure 3C:
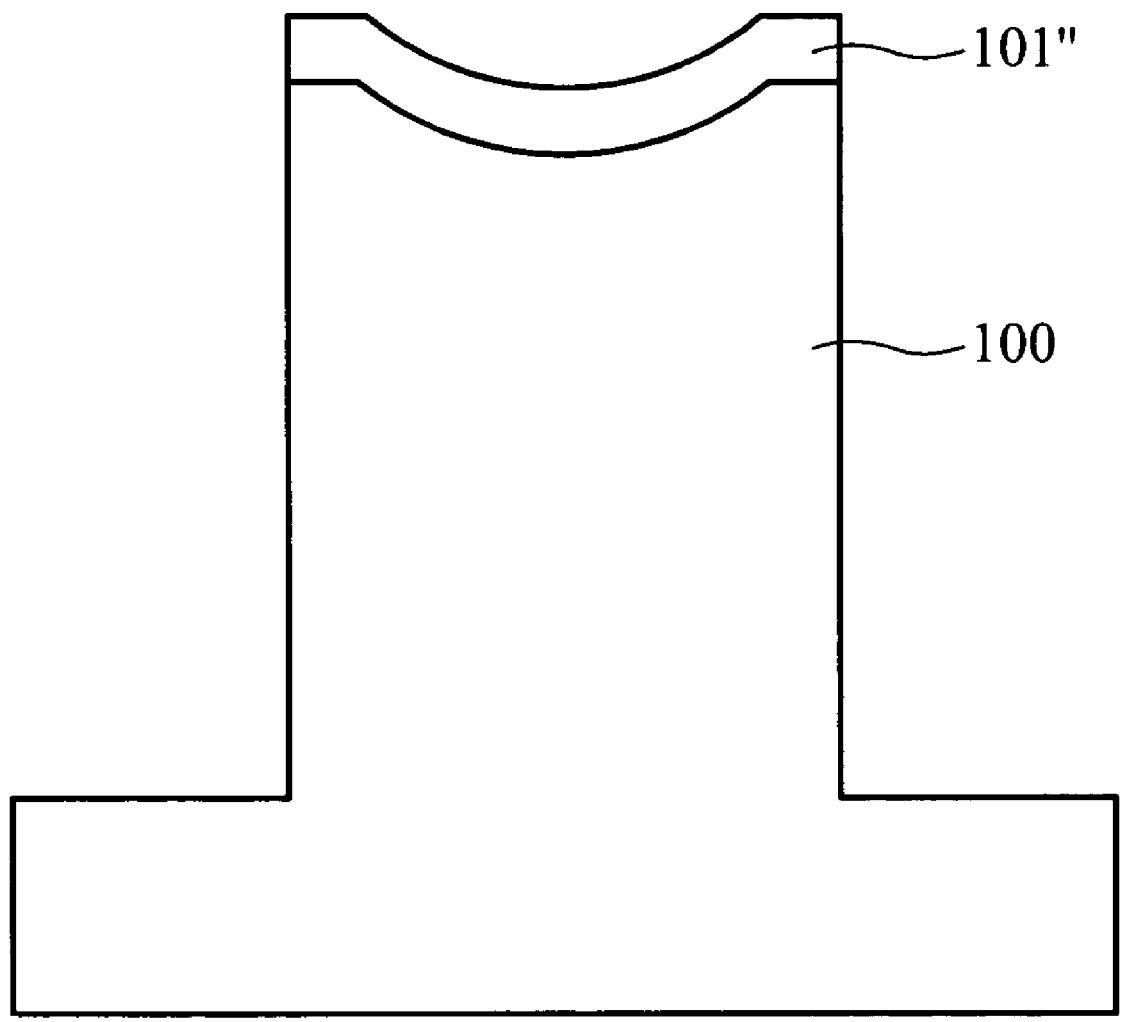

Further, in FIG. 2A, when the surface profile (surface accuracy) is damaged or deviates during removal of the passivation film 103 and intermediate layer 102, and the phosphorous content of the nickel-phosphorous alloy layer 101 is between about 4 and 30 wt %, preferably between about 10 and 30 wt %, the surface profile can be corrected by use of the diamond tool shown in FIG. 3C. During the surface profile correction, the exposed nickel-phosphorous alloy layer 101 is cut by the diamond blade 32, and the turning thickness thereof is set to be approximately 5 μm at most to achieve a desired surface profile (surface accuracy) and roughness.

Figure 2D:
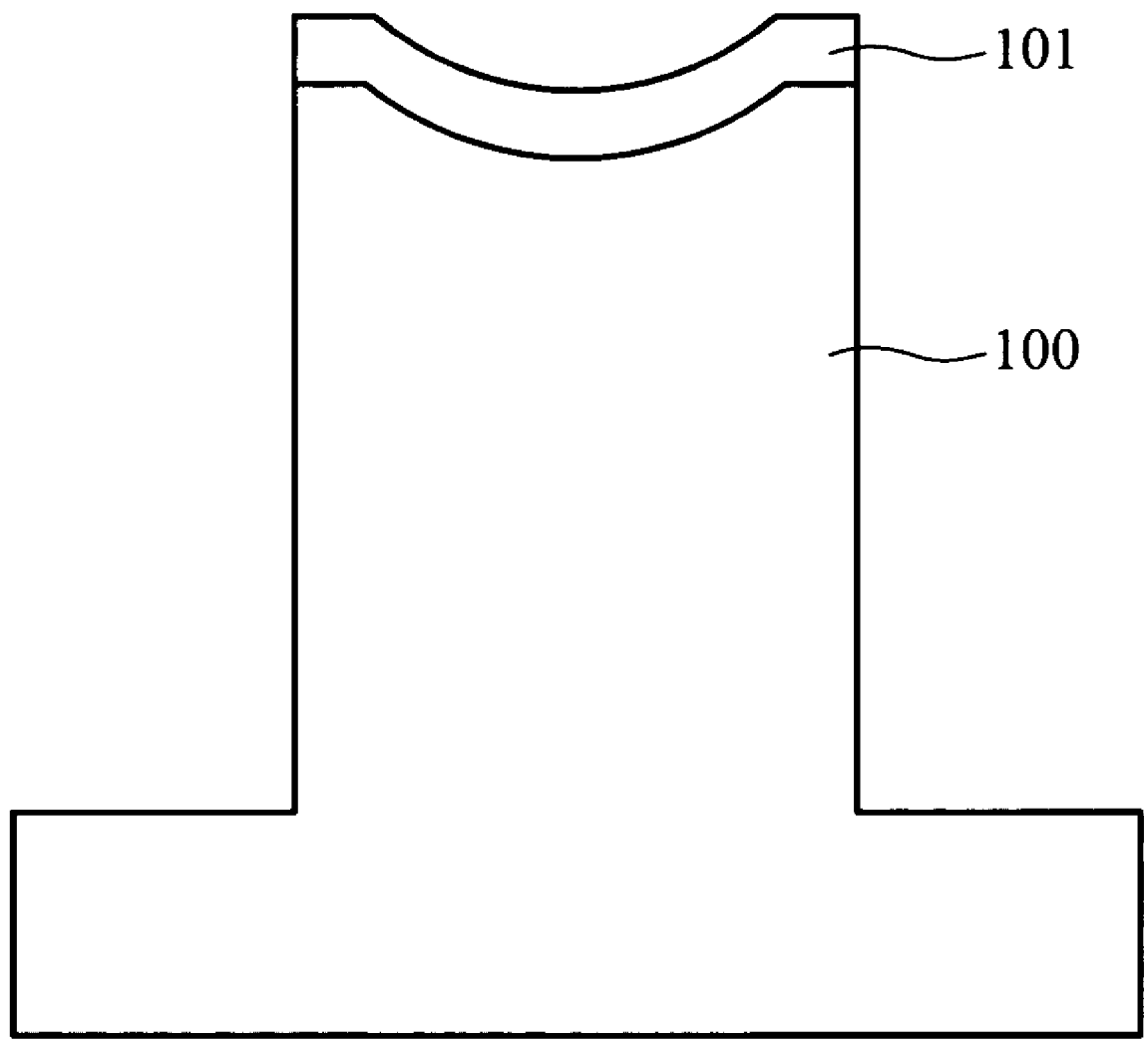

Next, the exposed nickel-phosphorous alloy layer 101 is cleaned by a method such as D.I. water rinse or other agents or methods not damaging the nickel-phosphorous alloy layer 101 to achieve the substrate 100 and exposed nickel-phosphorous alloy layer 101 in FIG. 2D.

Figure 2E:
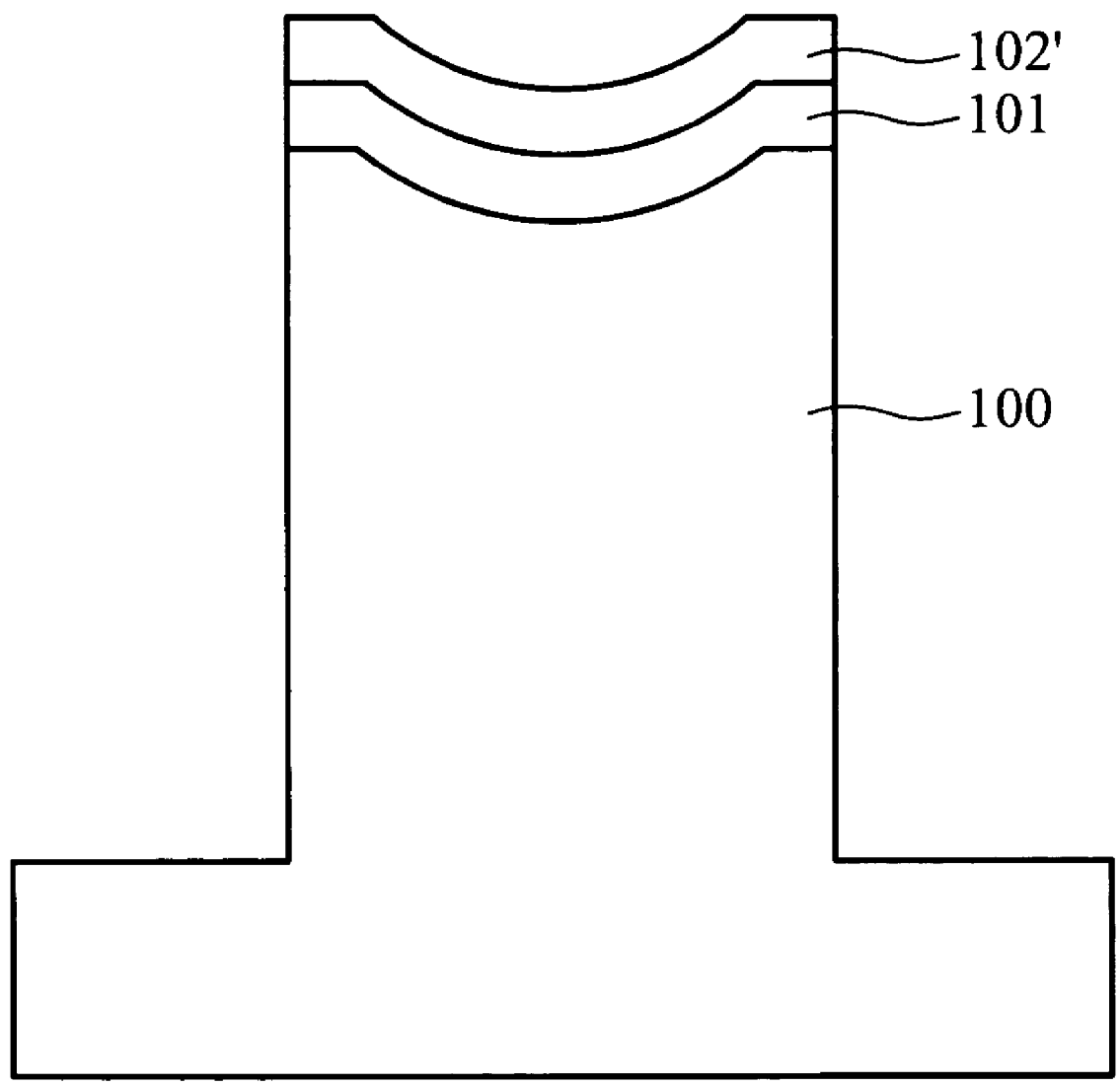
Figure 2F:
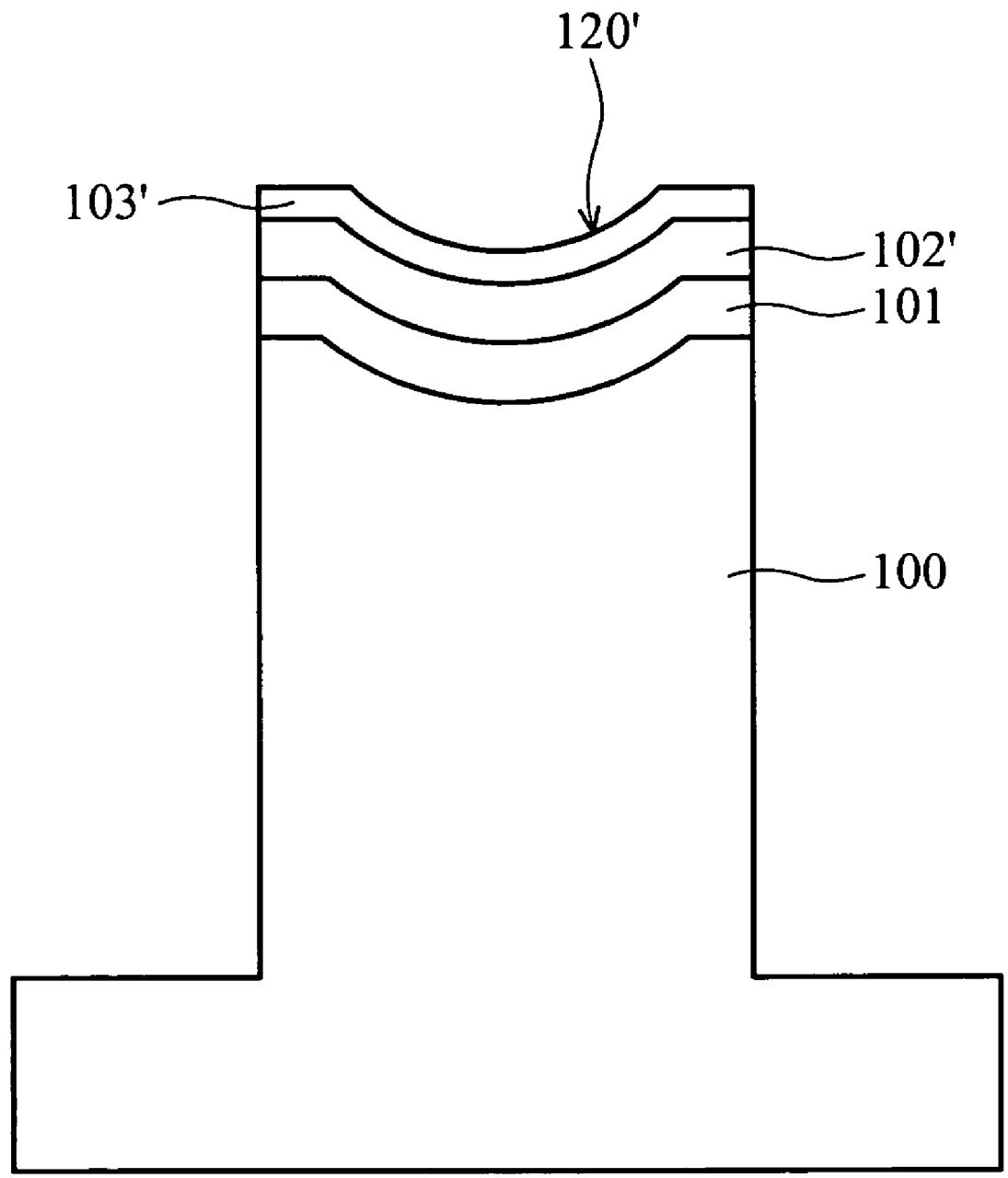

Next, in FIGS. 2E and 2F, a second intermediate layer 102' is formed overlying the nickel-phosphorous alloy layer 101, and a second passivation film 103' is formed overlying the second intermediate layer 102'. The second intermediate layer 102' preferably comprises nickel to improve adhesion between the nickel-phosphorous alloy layer 101 and second intermediate layer 102', and the second passivation film 103' is preferably chemically passive to prevent chemical reaction between glass and the renewed molding die during process to improve product yield and lifetime of the molding die. Further, the second passivation film 103' more preferably comprises noble metals such as combinations of at least two of iridium, rhenium, platinum, ruthenium, rhodium, and osmium, providing denser crystal structure to prevent the elements in substrate 100 from diffusion into the molding die surface, further improving product yield and lifetime of the renewed molding die. Therefore, the second intermediate layer 102' is more preferably an alloy of nickel and combinations of at least two of iridium, rhenium, platinum, ruthenium, rhodium, and osmium to improve adhesion between the second intermediate layer 102' and second passivation film 103'. Thus, adhesions between the substrate 100, nickel-phosphorous alloy layer 101, second intermediate layer 102', and second passivation film 103' are sufficient to improve lifetime and reduce the renewal frequency of the renewed molding die, reducing the process cost. Furthermore, the second intermediate layer 102' and intermediate layer 102 can be the same or different materials as desired. Similarly, the second passivation film 103' and passivation film 103 can be the same or different materials.

When the second intermediate layer 102' is an alloy of nickel and combinations of at least two of iridium, rhenium, platinum, ruthenium, rhodium, and osmium, the second intermediate layer 102' can be formed by a method such as co-sputtering. The substrate 100 with exposed nickel-phosphorous alloy layer 101 thereon shown in FIG. 4D is disposed in a chamber (not shown), and iridium, rhenium, platinum, ruthenium, rhodium, osmium and, nickel or nickel alloy targets are provided and bias power applied to each desired target respectively according to the predetermined composition of the second intermediate layer 102'. Sputtering time is determined according to the predetermined thickness of the second intermediate layer 102'. The second intermediate layer 102' is preferably 0.1 to 1 μm thick.

In FIG. 2F, when the second passivation film 103' comprises combinations of at least two of iridium, rhenium, platinum, ruthenium, rhodium, and osmium, the second passivation film 103' can be formed by a method such as co-sputtering. The second passivation film 103' is preferably formed immediately after the formation of the second intermediate layer 102'. When the formation of the second intermediate layer 102' is completed, the bias power to the iridium, rhenium, platinum, ruthenium, rhodium, osmium targets is the same as the formation of the second intermediate layer 102' and the bias power to the nickel or nickel alloy target is diamond-turned to form the second passivation film 103'. The thickness of the second passivation film 103' is preferably about 0.02 to 0.3 μm. The second passivation film 103' further has a second molding surface 120'. Thus, the molding die of the present invention is successfully renewed.

Examples of the formation and renewal of the molding die of the present invention are provided. Note that the process parameters provided subsequently, such as desired composition, thickness, and wearing rate are only examples, and are not intended to limit the scope of the present invention. Those skilled in the art will recognize the possibility of using many possible process parameters, to obtain the molding die of the present invention and renewal thereof.

EXAMPLE 1

A tungsten carbide substrate 100 was machined to create an approximately spherical surface, followed by formation of a nickel-phosphorous alloy layer 101, with low phosphorous content (approximately 3 wt %) and of approximately 30 μm thickness, using electroless plating. The nickel-phosphorous alloy layer 101 was ground to achieve a desired surface accuracy and roughness, followed by sequential formation of a Pt—Ir—Ni layer of approximately 0.1 μm thick and Pt—Ir layer of approximately 0.3 μm thick respectively acting as an intermediate layer 102 and passivation film 103. Thus, a molding die of the present invention was completed.

The molding die then served in a glass molding process. When the roughness (Rms) of the molding die exceeded 20 Å, the intermediate layer 102 and passivation film 103 were removed by grinding. A ratio of wear rates of the nickel-phosphorous alloy layer 101, intermediate layer 102, and passivation film 103 of described compositions was approximately 1:6.6:7.7. When the grinding apparatus contacted the nickel-phosphorous alloy layer 101, the wear rate was sharply reduced because the wear resistance of the nickel-phosphorous alloy layer 101 of the described composition was approximately the same as hard chromium. Thus, the grinding completion was easily detected. The nickel-phosphorous alloy layer 101 was then polished by a diamond grinding wheel with finer diamond particles to achieve a desired surface accuracy and roughness resulting from the composition thereof. Finally, the polished nickel-phosphorous alloy layer 101 was cleaned, followed by sequential formation of a second intermediate layer 102' and second passivation film 103' to achieve renewal of the molding die of the present invention. The renewed molding die then served in subsequent glass molding.

EXAMPLE 2

A tungsten carbide substrate 100 was machined to create an approximately spherical surface, followed by formation of a nickel-phosphorous alloy layer 101, with high phosphorous content (approximately 12 wt %) and of approximately 50 μm thick, using electroless plating. The nickel-phosphorous alloy layer 101 was cut to achieve a desired surface accuracy and roughness, followed by sequential formation of a Pt—Ir—Ni layer of approximately 0.1 μm thickness and Pt—Ir layer of approximately 0.3 μm thickness respectively acting as an intermediate layer 102 and passivation film 103. Thus, a molding die of the present invention was completed.

The molding die then served in a glass molding process. When the roughness (Rms) of the molding die exceeded 20 Å, the intermediate layer 102 and passivation film 103 were removed by grinding. A ratio of wear rates of the nickel-phosphorous alloy layer 101, intermediate layer 102, and passivation film 103 of described compositions was approximately 5.3:6.6:7.7. When the grinding apparatus contacted the nickel-phosphorous alloy layer 101, the wear rate was sharply reduced. Thus, the grinding completion was easily detected. The nickel-phosphorous alloy layer 101 was then polished by a single point diamond tool with cut thickness less than 5 μm to achieve a desired surface accuracy and roughness from described composition thereof. Finally, the polished nickel-phosphorous alloy layer 101 was cleaned, followed by sequential formation of a second intermediate layer 102' and second passivation film 103' to achieve renewal of the molding die of the present invention. The renewed molding die then served in subsequent glass molding.

EXAMPLE 3

A tungsten carbide substrate 100 was machined to create an approximately spherical surface, followed by formation of a tungsten containing nickel-phosphorous alloy layer 101, with high phosphorous content (approximately 15 wt % of phosphorous and 7 wt % of tungsten) and of approximately 50 μm thickness, using electroless plating. The nickel-phosphorous alloy layer 101 was diamond-turned to achieve a desired surface accuracy and roughness, followed by sequential formation of a Pt—Ir—Ni layer of approximately 0.1 μm thickness and Pt—Ir layer of approximately 0.3 μm thickness respectively acting as an intermediate layer 102 and passivation film 103. Thus, a molding die of the present invention was completed.

The molding die then served in a glass molding process. When the roughness (Rms) of the molding die exceeded 20 Å, the intermediate layer 102 and passivation film 103 were removed by grinding. A ratio of wear rates of the nickel-phosphorous alloy layer 101, intermediate layer 102, and passivation film 103 of described compositions was approximately 3.4:6.6:7.7. When the grinding apparatus contacted the nickel-phosphorous alloy layer 101, the wear rate was sharply reduced. Thus, the grinding completion was easily detected. The nickel-phosphorous alloy layer 101 was then polished by a singe point diamond tool with cut thickness less than 5 μm to achieve a desired surface accuracy and roughness from described composition thereof. Finally, the polished nickel-phosphorous alloy layer 101 was cleaned, followed by sequential formation of a second intermediate layer 102' and second passivation film 103' to achieve renewal of the molding die of the present invention. The renewed molding die then served in subsequent glass molding.

FIGS. 3A through 3E are cross-sections of another embodiment of the renewal method of the molding die of the present invention.

When the molding die shown in FIG. 1 is renewed by the method shown in FIGS. 2A through 2F several times, the nickel-phosphorous alloy layer 101 thins from repeated polish or surface correction. When thickness of the nickel-phosphorous alloy layer 101 is insufficient for grinding or turning (depending on process requirements, renewal apparatuses, and other factors), the renewal method of this embodiment is processed.

In FIG. 3A, following methods shown in FIG. 2F, the second passivation film 103' and second intermediate layer 102' are removed. Details regarding the removal are the same as those described for FIG. 2A, and thus, are omitted herefrom.

Next, in FIG. 3B, the nickel-phosphorous alloy layer 101 is removed, exposing the substrate 100. It is preferred to etch the nickel-phosphorous alloy layer 101 using nitric acid to quickly and completely remove the nickel-phosphorous alloy layer 101 without damage to the substrate 100. The removal of the nickel-phosphorous alloy layer 101 may be achieved by other known chemical methods such as etching with high etch selectivity of the nickel-phosphorous alloy layer 101 to substrate 100 or mechanical methods such as grinding and turning without damage to substrate 100.

Next, the exposed substrate 100 is cleaned by a method such as D.I. water rinse or other agents or methods not damaging the substrate 100, followed by polishing, and/or surface correction of the exposed substrate 100 as desired.

Next, in FIG. 3C, a second nickel-phosphorous alloy layer 101" is formed overlying the substrate 100 using a method such as electroless plating or sputtering. The phosphorous content of the second nickel-phosphorous alloy layer 101" is as large as 30 wt % or less. The second nickel-phosphorous alloy layer 101" is preferably about 20 to 100 μm thick, and more preferably further comprises about 0.1 to 10 wt % of high melting point metal such as tungsten, tantalum, manganese, or combinations thereof to further improve the hardness, wear resistance, and thermal resistance thereof, thereby improving lifetime of the second nickel-phosphorous alloy layer 101" and further the renewed molding die. Further, the second nickel-phosphorous alloy layer 101" and nickel-phosphorous alloy layer 101 are the same or different compositions as desired.

Figure 3D:
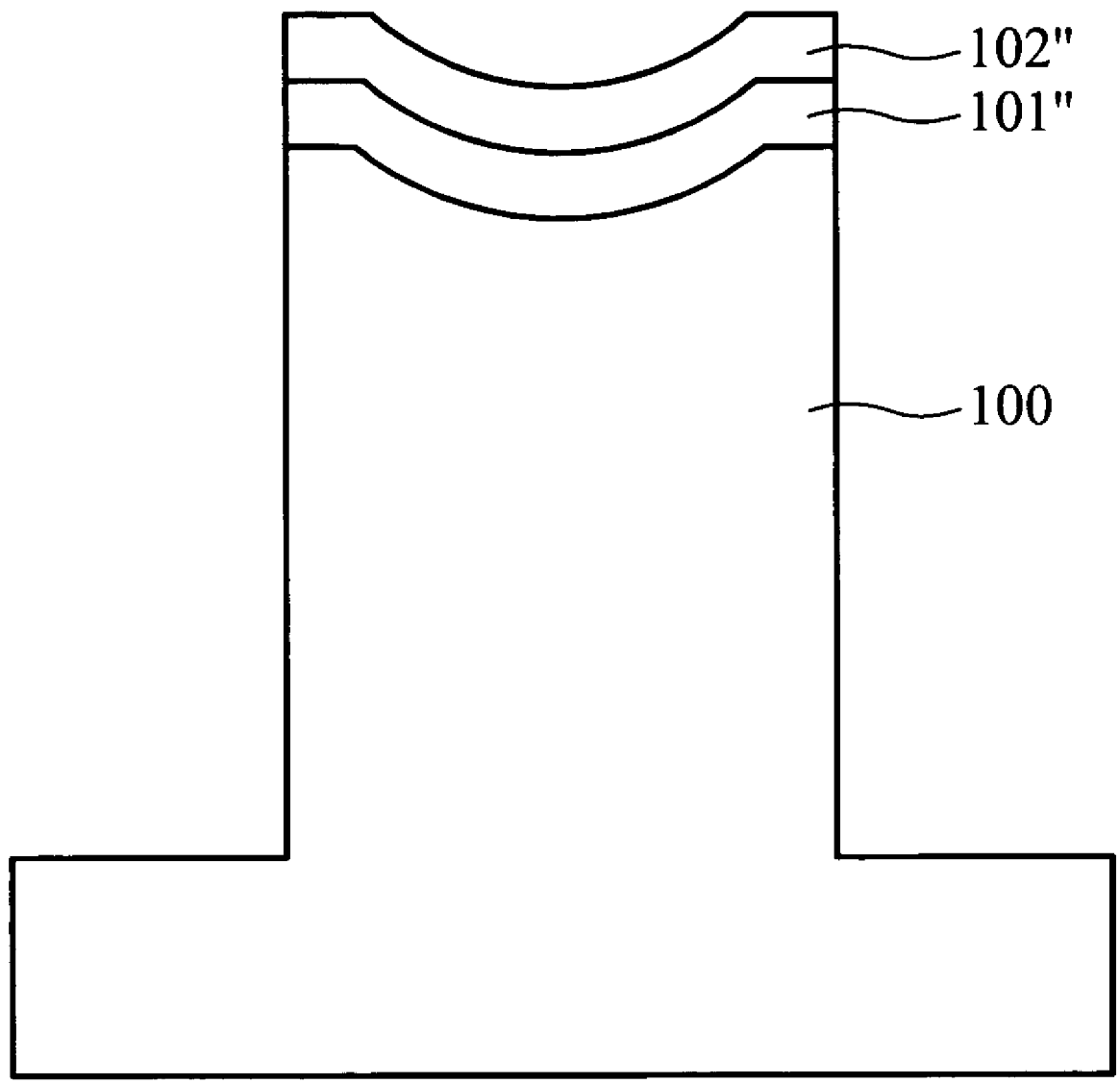

Next, in FIG. 3D, a second intermediate layer 102" is formed overlying the second nickel-phosphorous alloy layer 101". Details regarding the second intermediate layer 102" are the same as the second intermediate layer 102' described for FIG. 2E, and thus, are omitted herefrom.

Figure 3E:
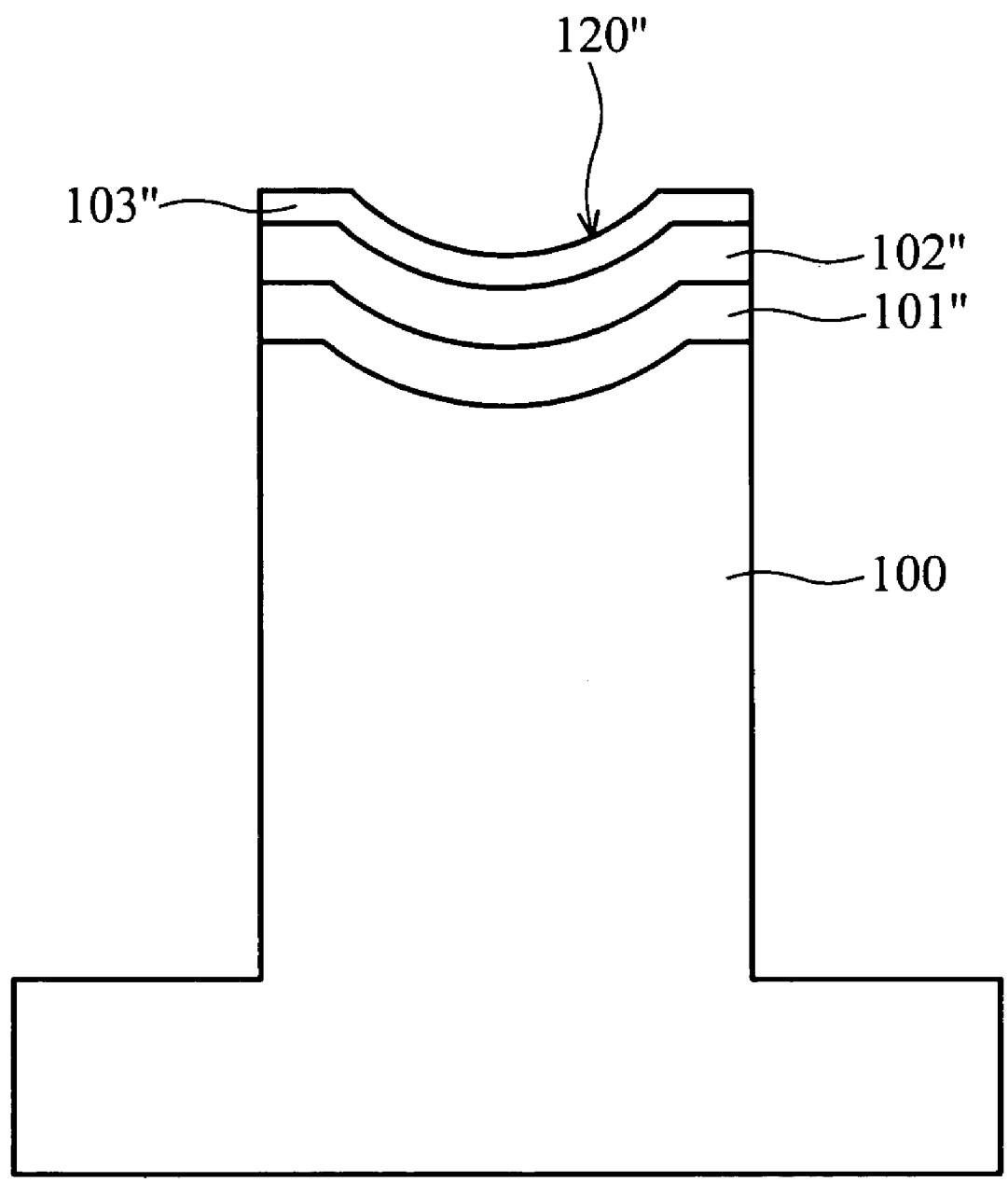

Finally, in FIG. 3E, a second passivation layer 103" is formed overlying the second intermediate layer 102". The second passivation film 103" further comprises a second molding surface 120". Thus, the molding die of the present invention is successfully renewed. Details regarding the second passivation film 103" are the same as for the second passivation film 103' described for FIG. 2F, and thus, are omitted herefrom.

Thus, the results show the efficacy of the inventive molding die in providing a nickel-phosphorous alloy layer acting as a machined layer overlying a molding die substrate, and not damaging the diamond tool during renewal thereof resulting from the electrons of phosphorous sharing with unshared electrons of nickel, which is more apparent when phosphorous content of the nickel-phosphorous alloy layer is between 10 to 30 wt %, easily and quickly correcting the surface profile (surface accuracy) of the nickel-phosphorous alloy layer when deviated, quickly and completely removing the nickel-phosphorous alloy layer without damage to substrate, and forming a new nickel-phosphorous alloy layer thereon, improving the renewability of the molding die and reducing the renewal cost, thereby achieving the described objects of the present invention.

Although the present invention has been particularly shown and described with reference to the preferred specific embodiments and examples, it is anticipated that alterations and modifications thereof will no doubt become apparent to those skilled in the art. It is therefore intended that the following claims be interpreted as covering all such alteration and modifications as fall within the true spirit and scope of the present invention.

What is claimed is:

1. A renewal method for a glass molding die, comprising: providing a used glass molding die comprising a substrate, a nickel-phosphorous alloy layer, with phosphorous content 30 wt % or less, overlying the substrate, a first intermediate layer overlying the nickel-phosphorous alloy layer, and a first passivation film overlying the first intermediate layer; removing the first passivation film and first intermediate layer using the nickel-phosphorous alloy layer as a stop layer, exposing the nickel-phosphorous alloy layer; cleaning the exposed nickel-phosphorous alloy layer; forming a second intermediate layer overlying the nickel-phosphorous alloy layer; and forming a second first passivation film overlying the second intermediate layer.

2. The method as claimed in claim 1, wherein the substrate comprises tungsten carbide.

3. The method as claimed in claim 1, wherein the nickel-phosphorous alloy layer further comprises approximately 0.1 to 10 wt % of high melting point metals or alloys thereof.

4. The method as claimed in claim 1, wherein the first passivation film and first intermediate layer are removed by abrasive machining or grinding.

5. The method as claimed in claim 1, further comprising polishing the exposed nickel-phosphorous alloy layer using grinding when the first passivation film and first intermediate layer are removed.

6. The method as claimed in claim 5, wherein the phosphorous content of the nickel-phosphorous alloy layer is between about 1 to 10 wt %.

7. The method as claimed in claim 1, further comprising polishing the exposed nickel-phosphorous alloy layer using diamond turning when the first passivation film and first intermediate layer are removed.

8. The method as claimed in claim 7, wherein the phosphorous content of the nickel-phosphorous alloy layer is between about 4 to 30 wt %.

9. The method as claimed in claim 8, wherein the phosphorous content of the nickel-phosphorous alloy layer is between about 10 to 30 wt %.

10. The method as claimed in claim 7, wherein the first nickel-phosphorous alloy layer and second nickel-phosphorous alloy layer further comprise about 0.1 to 10 wt % of tungsten, tantalum, manganese, or combinations thereof, and the first nickel-phosphorous alloy layer and second nickel-phosphorous alloy layer are approximately the same or different composition.

11. The method as claimed in claim 1, further comprising correcting a surface profile of the exposed nickel-phosphorous alloy layer when the first passivation film and first intermediate layer are removed.

12. The method as claimed in claim 11, wherein the surface profile of the exposed nickel-phosphorous alloy layer is corrected by diamond turning.

13. The method as claimed in claim 12, wherein the phosphorous content of the nickel-phosphorous alloy layer is between about 4 to 30 wt %.

14. The method as claimed in claim 1, wherein the second intermediate layer is about 0.1 to 1 μm thick.

15. The method as claimed in claim 1, wherein the first passivation film and second passivation film comprise combinations of at least two of iridium, rhenium, platinum, ruthenium, rhodium, and osmium, and the first passivation film and second passivation film are approximately the same material.

16. The method as claimed in claim 1, wherein the passivation film is about 0.02 to 0.3 μm thick.

17. A renewal method for a glass molding die, comprising:
providing a used glass molding die comprising a substrate, a first nickel-phosphorous alloy layer, with phosphorous content as large as 30 wt % or less, overlying the substrate, a first intermediate layer overlying the nickel-phosphorous alloy layer, and a first passivation film overlying the first intermediate layer;
removing the first passivation film and first intermediate layer using the first nickel-phosphorous alloy layer as a stop layer, exposing the first nickel-phosphorous alloy layer;
removing the first nickel-phosphorous alloy layer using the substrate as a stop layer, exposing the substrate;
cleaning the exposed substrate;
forming a second nickel-phosphorous alloy layer, with phosphorous content 30 wt % or less, overlying the substrate;
forming a second intermediate layer overlying the second nickel-phosphorous alloy layer; and
forming a second first passivation film overlying the second intermediate layer.

18. The method as claimed in claim 17, wherein the substrate comprises tungsten carbide.

19. The method as claimed in claim 17, wherein the first passivation film and first intermediate layer are removed by a diamond grinding wheel assembly.

20. The method as claimed in claim 17, wherein the first nickel-phosphorous alloy layer is removed by nitric acid.

21. The method as claimed in claim 17, wherein the second nickel-phosphorous alloy layer is about 20 to 100 μm thick.

22. The method as claimed in claim 17, wherein the first intermediate layer and second intermediate layer comprise nickel and combinations of at least two of iridium, rhenium, platinum, ruthenium, rhodium, and osmium, and the first intermediate layer and second intermediate layer are approximately the same or different material.

23. The method as claimed in claim 17, wherein the second intermediate layer is about 0.1 to 1 μm thick.

24. The method as claimed in claim 17, wherein the first passivation film and second passivation film comprise combinations of at least two of iridium, rhenium, platinum, ruthenium, rhodium, and osmium, and the first passivation film and second passivation film are approximately the same material.

25. The method as claimed in claim 17, wherein the second passivation film is about 0.02 to 0.3 μm thick.

* * * * *